United States Patent [19]

Cheng

[11] Patent Number: 5,342,177
[45] Date of Patent: Aug. 30, 1994

[54] TIRE AUTOMATIC PNEUMATIC PUMP DEVICE

[76] Inventor: Chen-Kuang Cheng, No. 3, Alley 14, Lane 85, Dingchou Rd., Sec. 4, Taipei, Taiwan

[21] Appl. No.: 861,909

[22] Filed: Apr. 1, 1992

[51] Int. Cl.$^5$ ............................................. F04B 17/06
[52] U.S. Cl. .................................. 417/233; 280/304.2
[58] Field of Search ...................... 417/233; 280/288.4, 280/304.2

[56] References Cited

U.S. PATENT DOCUMENTS

| | | | |
|---|---|---|---|
| 2,415,618 | 2/1947 | West | 417/233 |
| 4,061,200 | 12/1977 | Thompson | 417/233 |

FOREIGN PATENT DOCUMENTS 0331183  10/1935  Italy ................................... 417/233

*Primary Examiner*—Richard A. Bertsch
*Assistant Examiner*—Alfred Basichas
*Attorney, Agent, or Firm*—Bacon & Thomas

[57] ABSTRACT

An automotive bicycle tire pump is disclosed in which a cylinder and piston assembly rotates with the wheel rim and tire. The piston is reciprocated by contact with a stationary cam to provide pressurized air to the tire. When the proper tire pressure is reached, the piston is automatically latched in a position out of contact with the cam to prevent reciprocation of the piston.

5 Claims, 7 Drawing Sheets

TIRE AUTOMATIC PNEUMATIC PUMP DEVICE

BACKGROUND OF THE INVENTION

Traditional manual or motor drive vehicles like bicycles, pedicabs, and motorcycles need well equipped air inflated tires. Once the tire pressure (TP) is insufficient due to leakage, the tires can't execute rotary work as usual, but must be sent to the tire shop for repair. Traditional air inflation devices may be a manual pneumatic cylinder (PC), or an electrical air compressor. An obvious defect of them is that they both are stationary types without the convenience of portability.

Certain bicycles are already equipped with a mini-portable manual pneumatic cylinder (PC), but these require considerable use of manpower and time for reparative treatment. Therefore, they are not deemed practical or effective air inflation devices.

SUMMARY OF THE INVENTION

One of the major purposes of this invention is to present an automatic tire pneumatic pump device (TAPPD) featuring a simple, compact structure for obtaining appropriate tire pressure immediately which also keeps the bicycle riding comfortable.

Another purpose of this invention is to achieve a directly installed block head (BH) and pneumatic cylinder (WR) upon wheel rim (WR) that continuously implements adequate pumped air injection of the tire.

Another purpose of this invention is to provide a specific design of a pneumatic cylinder structure that readily maintains the tire pressures. If the tire pressure is insufficient, it automatically initiates the air inflation operation for the best condition of riding.

The structure of the automatic tire pressure pump device may be characterized by a pneumatic cylinder which can automatically pump air into the tire through a rotary axle sleeve (RAS) during the rotary operation of the wheel rim (WR).

DETAILED DESCRIPTION OF THE PREFERRED EMBODIMENT

Figure 1:
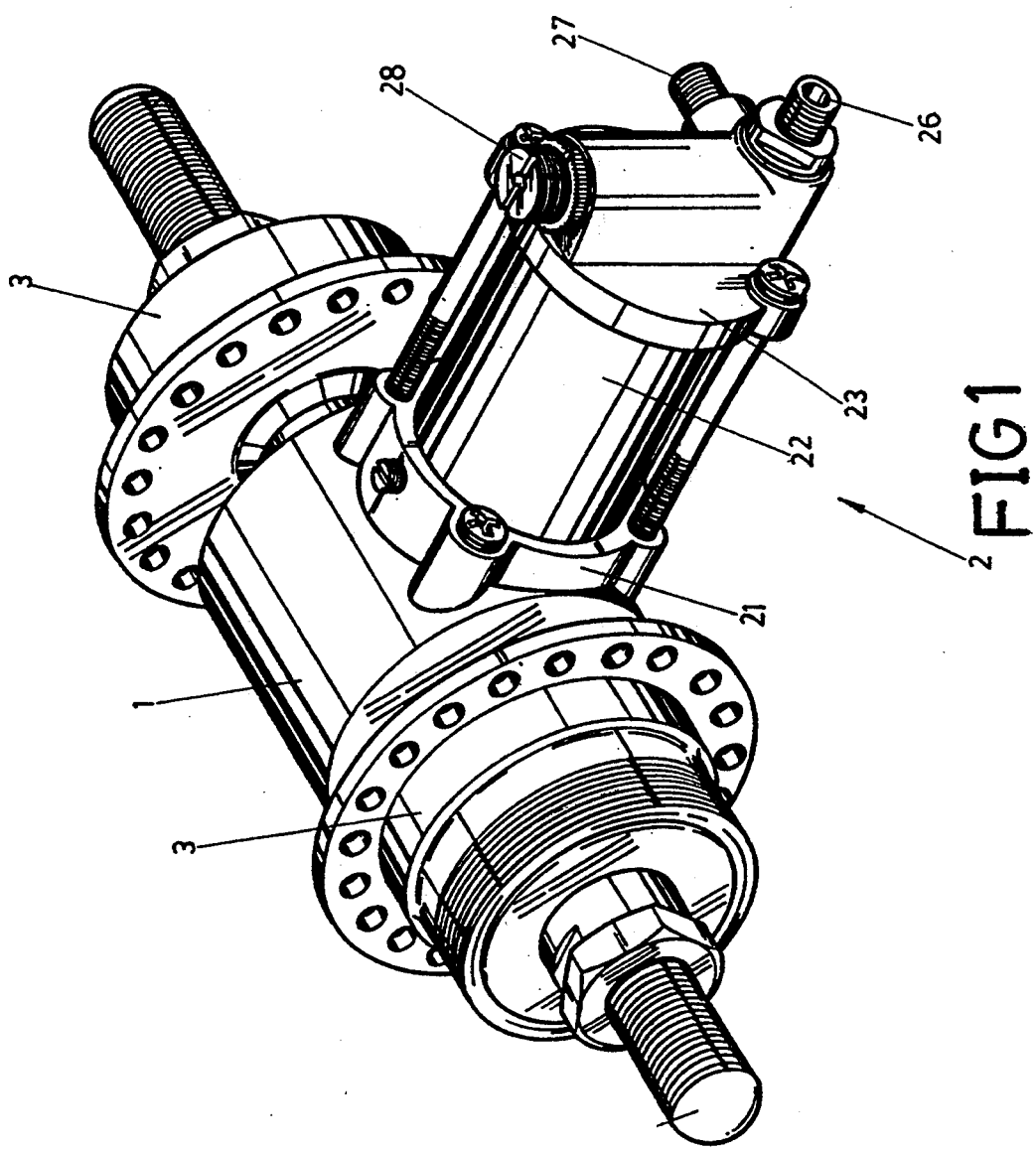
FIG. 1 is a perspective view of the pneumatic pump device according to the present invention.
Figure 2:
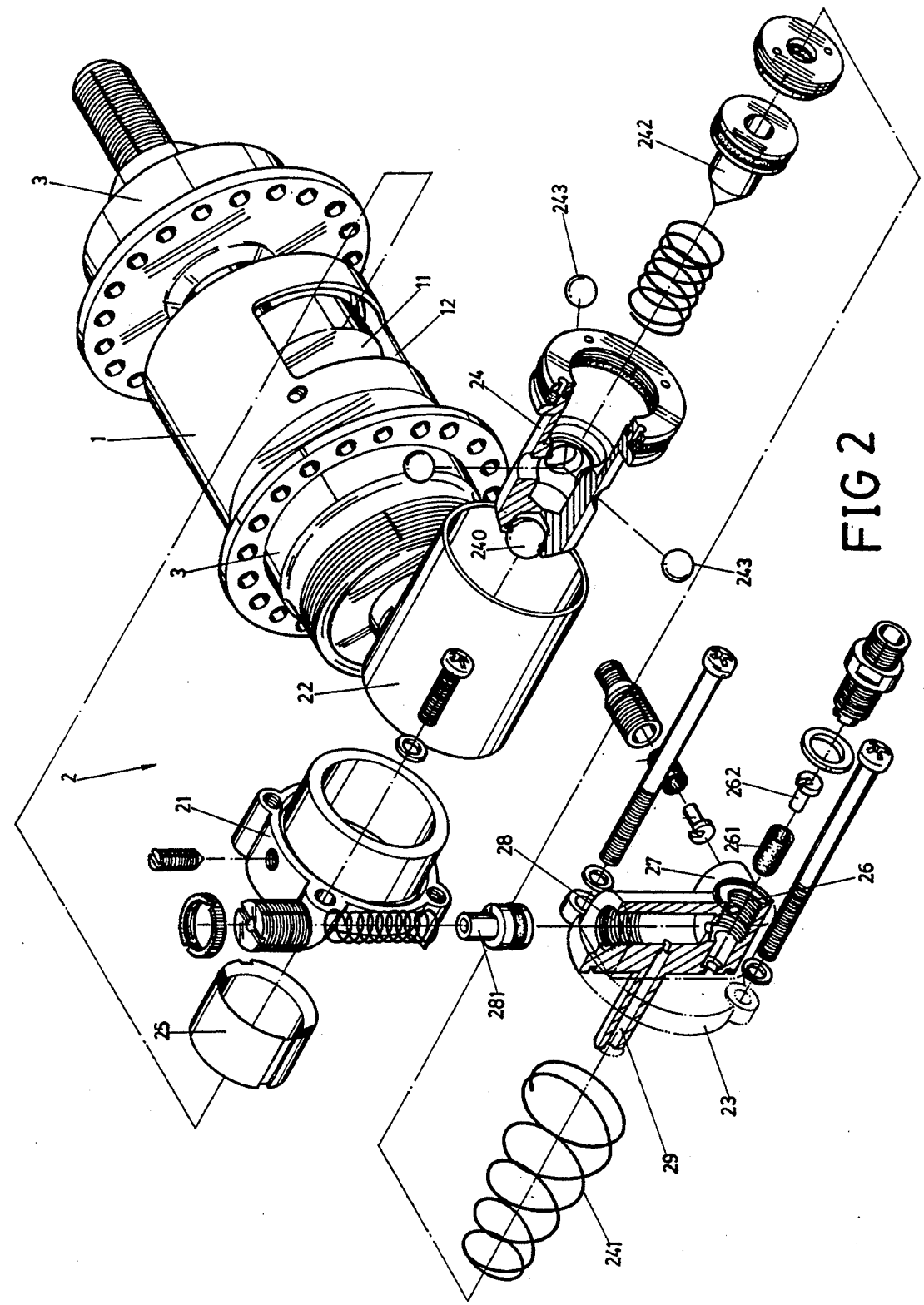
FIG. 2 is an exploded perspective view of the device shown in FIG. 1.
Figure 3:
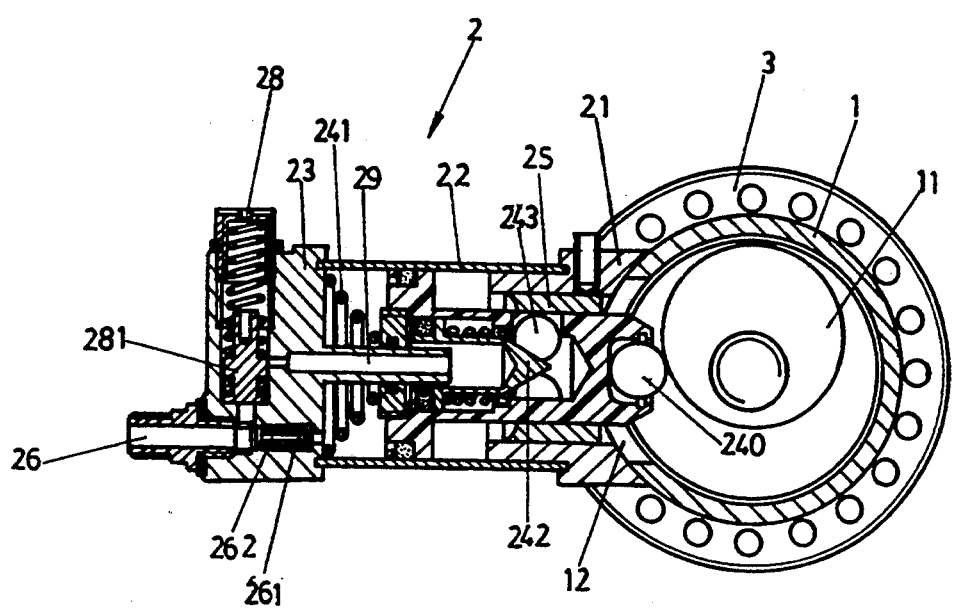
FIG. 3 is a vertical side cross-sectional view of the device according to the present invention.
Figure 4:
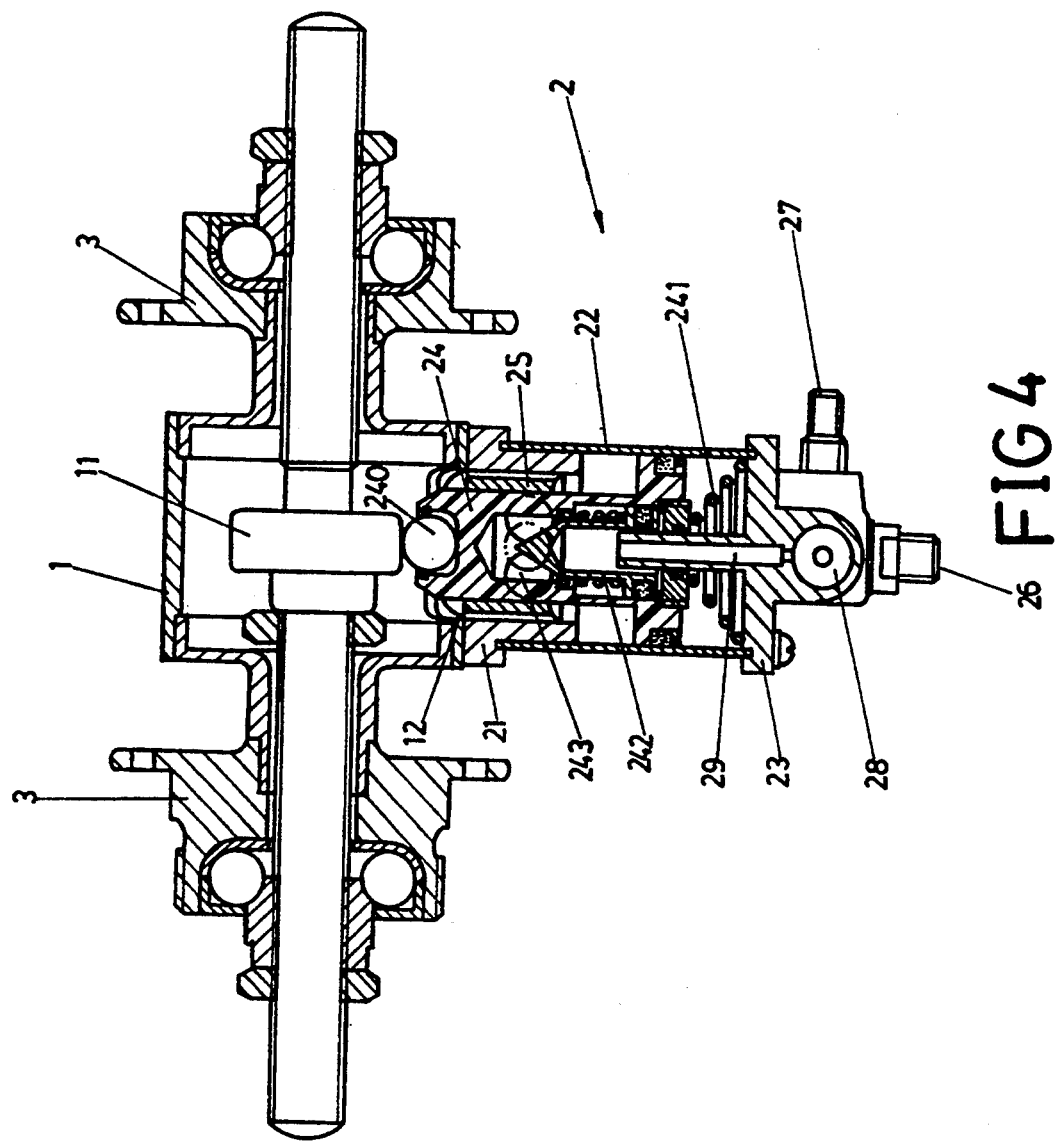
FIG. 4 is a lateral, top cross-sectional view of the invention of FIG. 3.

FIGS. 1 and 2 illustrate an automatic tire pneumatic pump device that utilizes an automatic injection scheme to sustain tire pressure during riding during the rotation of the wheel rim. It consists of block head (1) and pneumatic cylinder (2). The block head is constructed as hollow seat having both sides stationarily joined to the wheel rim's axle sleeve (3), so that it rotationally follows the rotation of the axle sleeve. Its central part is penetrated by the wheel rim axle. A drive cam (11) is fixedly equipped upon the wheel rim axle and is located in a hollow part of the block head (1) such that the cam is not affected by rotation of block head (1). Furthermore, an assembly hole (12) extends through the block head (1) facing the drive cam (11). This enables the pneumatic cylinder (2) to be assembled jointly with the block head (1), such that the rotation of the pneumatic cylinder follows the rotation of the block head (1) driven by axle sleeve (3). Thus, the pneumatic cylinder (2) top end will intervally be pushed out by cam (11) due to this rotation.

The pneumatic cylinder (2) is a pneumatic pressurized pump structure, having front cylinder sleeve (21), cylinder wall (22) and rear cylinder sleeve (23). The front cylinder sleeve (21) is installed at the assembly hole (12) on the block head (1) outer surface. Extending inwardly the piston (24) has a front edge installed with a rolling ball (240) which extends out from the front cylinder sleeve (21) outer part. Outlet valve (26) is installed at the rear cylinder sleeve (23) outer edge. Inward of the valve are contained a capped sleeve (261) and air current rod (262). This enables the air current that is pushed out by piston (24) to flow into a tire without a return current of time pressure. Moreover, inlet valve (27) is set at a side edge of outlet valve (26), such that it can be used for auxiliary manual air injective application. An adjustment valve (28) is installed at an upper portion of outlet valve (26). The valve pillar (281) in the outlet valve (28) controls the size of air current pressure. The inner portions of valves (26), (27) and (28) are connected through by holes. The mid-section of adjustment valve (28) has a hole that is connected to circuitous pressure pipe (29). The circuitous pressure pipe (29) is inserted into a hollow center of piston (24) through return stroke spring (241). The hollowed part of piston (24) contains tapered piston (242). The hollowed part of piston's (242) rear edge is used to accommodate a portion of circuitous pressure pipe (29). A wall of piston (24) located adjacent to the tapered front edge of piston (242) has openings into which are inserted several balls (243). Under normal conditions, the balls (243) do not extend out from the piston's (24) wall. If balls do not extend out from the piston's (242) tapered part, the balls (243) are urged out of piston's (24) outer wall to block the reciprocal movement of piston (24) at a tapered slope of neck ring (25).

Figure 5:
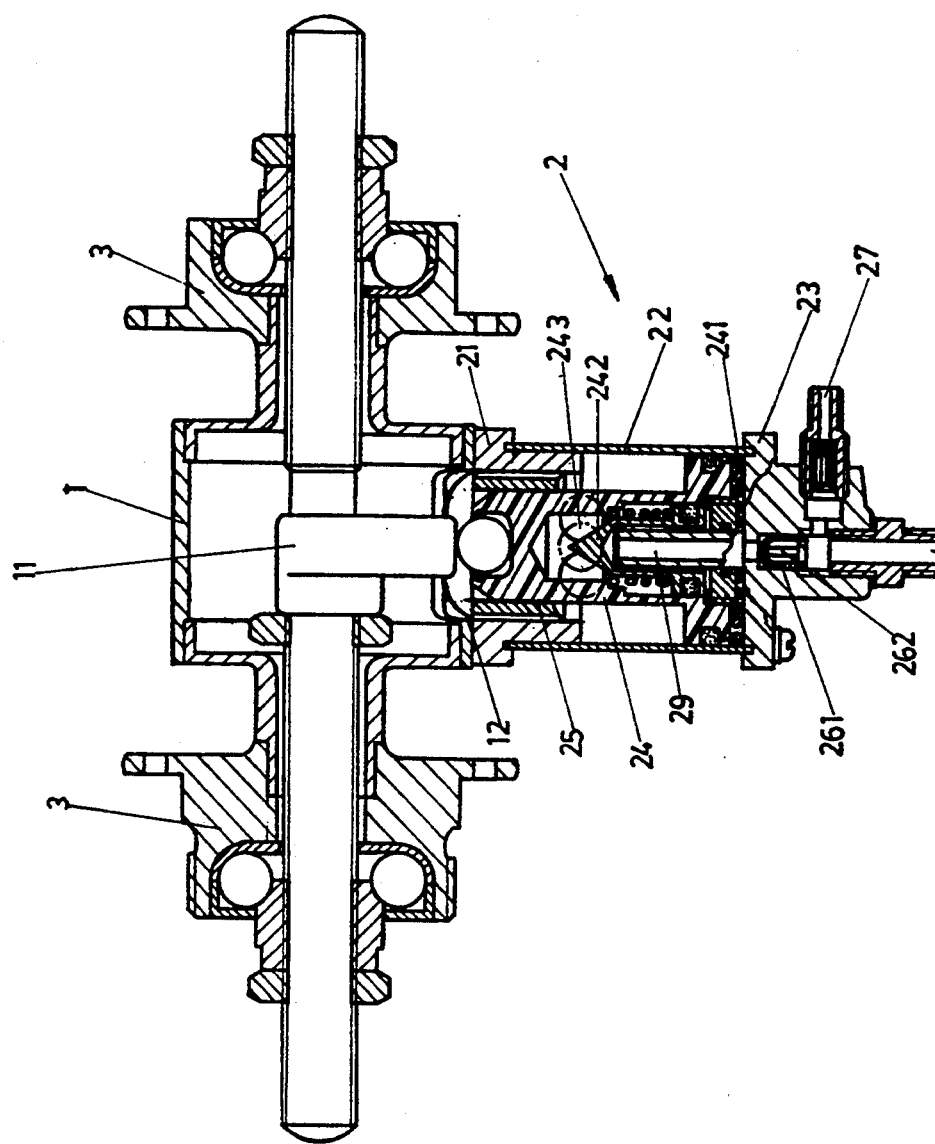
FIG. 5 is a cross-sectional view similar to FIG. 4 illustrating the invention when injecting air into the tire.

If the reciprocal movement of piston (24) has halted, the air injective operation is also stopped. In operation, while the wheel rim initially rotated, the block (1), pneumatic cylinder (2), and axle sleeve (3) are also rotating. But the drive cam (11) is stationarily located upon the wheel axle and won't move at all. This brings rolling ball (240) located on piston's (24) front edge into contact intervally with drive cam (11) during the rotation of pneumatic cylinder (2). As illustrated in FIG. 5 while piston (24) moves, it not only compresses return stroke spring (241), but also presses the air in air chamber in space between piston (24) and cylinder sleeve (23), into outlet valve (26). This air is injected into the tire through an air pipe (not shown) that is connected directly to an air nozzle of the tire. During the time that piston (24) is not driven by cam (11), the piston (24) is urged inwardly by the elastic function of return stroke opening (241) causing outer air to enter the space formed by piston's (24) return stroke through an air pipe. The return stroke causes ball (240) of piston (24) to extend out at of pneumatic cylinder (2) front cylinder sleeve (21) to facilitate another engagement opportunity with drive cam (11).

Figure 6:
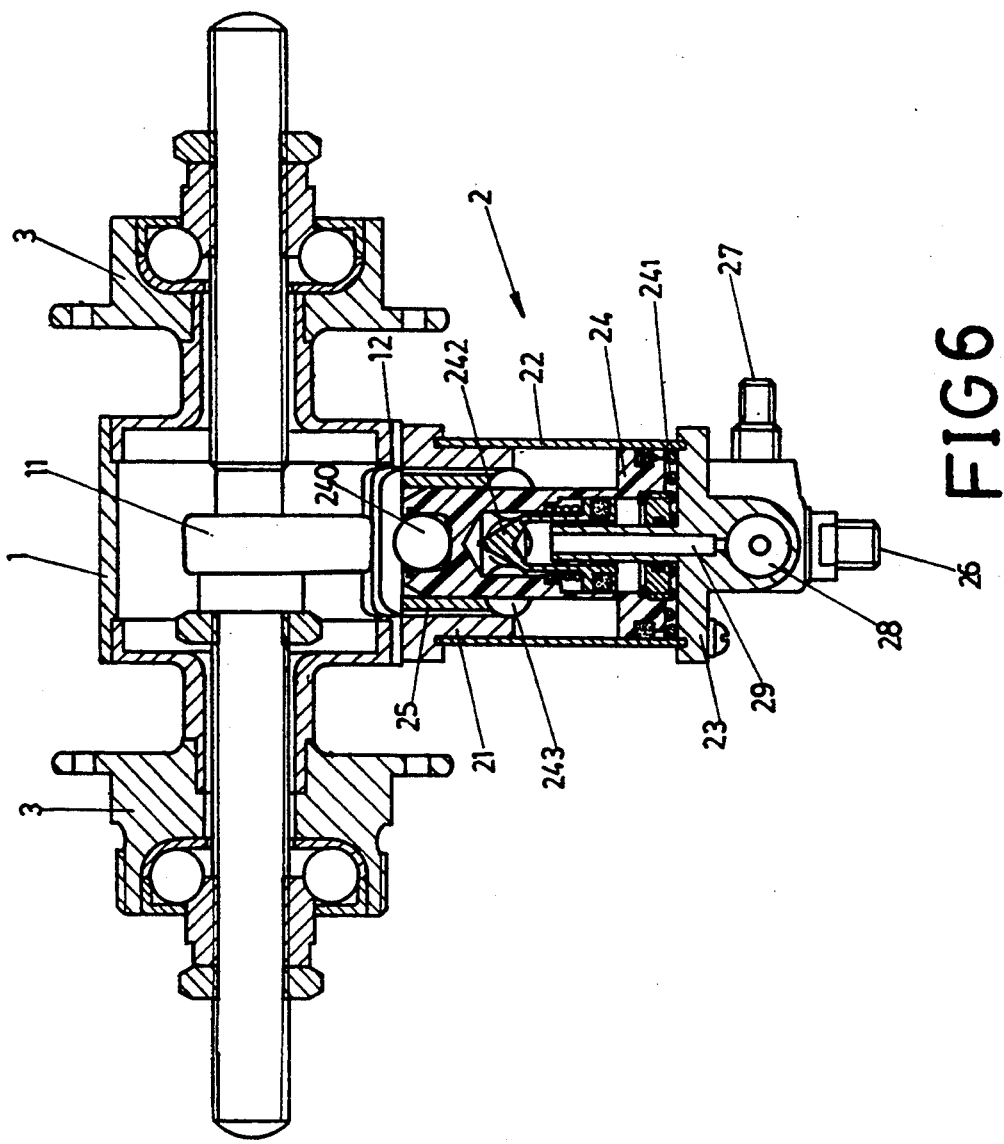
FIG. 6 is a cross-sectional view similar to FIG. 5 illustrating the invention when tire pressure is normal.
Figure 7:
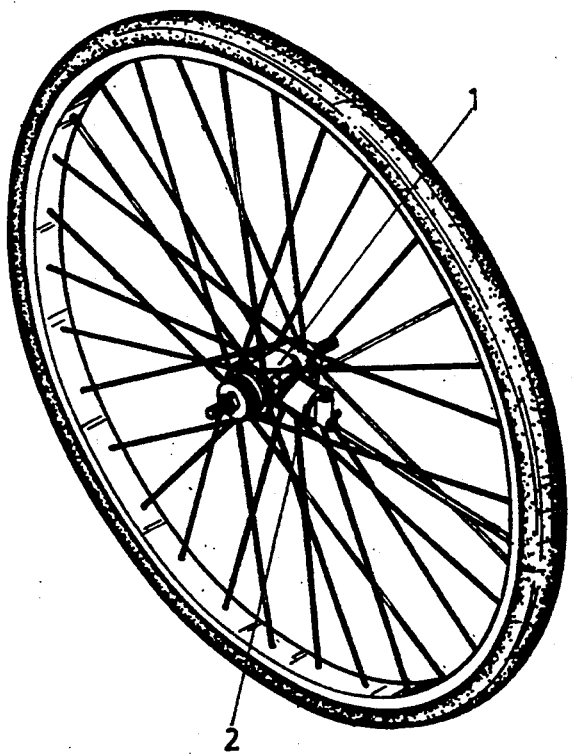
FIG. 7 is a perspective view of a wheel assembly incorporating the present invention.

Because the piston (24) is contacted by drive cam (11) as the tire rotates, it presses air into tire sustaining the proper pressure in the tire. When the tire pressure is at the proper condition, through the function of adjustment valve's (28) valve pillar (281), the air current pressed by piston (24) does not enter outlet valve (26) to inject air into the tire, but instead air passes into circuitous pressure pipe (29) through adjustable valve (28). As shown in FIG. 6 the air that has entered circuitous pressure pipe (29) causes tapered piston (242) to move inwards relative to piston (24). This pushes balls (243) outwards of pistion's (24) outer wall, to engage tapered slope of neck ring (25) before piston (24) returns to the front cylinder sleeve (21).

This keeps the piston (24) away from the front cylinder sleeve (21) and out of contact with drive cam (11). This allows idle rotation of pneumatic cylinder (2) and avoids over pressurization of the tire. When the tire pressure drops below a normal condition, the air existing in tapered piston (242) and circuitous pressure pipe (29) will flow into outlet valve (26). Therefore the tapered piston (242) will be withdrawn due to resilience of a biasing spring and balls (243) will also be retracted inwards of piston (24). Finally the piston (24) is released from restriction and returns to reciprocal air injective operation. Mentioned mechanisms were integrated as a singular compact structure as of the invention.

I claim:

1. An automatic pump for a pneumatic tire mounted on a rim having a hub attached to and rotatable with respect to a stationary axle, comprising:
   a) an eccentric drive cam fixedly attached to the stationary axle;
   b) a pneumatic pump assembly attached to the hub so as to rotate therewith, the pneumatic pump assembly comprising:
      i) a hollow pneumatic cylinder attached to the hub;
      ii) a first piston slidably located within the pneumatic cylinder, the first piston defining a recess in a first end and having a second end;
      iii) a second piston slidably located in the recess of the first piston;
      iv) biasing means to normally bias the first piston into contact with the drive cam such that rotation of the pump assembly causes the cam to reciprocate the first piston within the pneumatic cylinder thereby compressing air within the pneumatic cylinder; and,
      v) latching means actuated by relative movement between the first and second pistons to latch the first piston in a position out of contact with the drive cam thereby preventing reciprocation of the first piston;
   c) means defining a first air flow passage between the pneumatic cylinder and the tire;
   d) first valve means located in the first air flow passage and comprising a one way valve to allow air compressed by the first piston to flow from the pneumatic cylinder into the tire, but prevent flow in the reverse direction;
   e) means defining a second air flow passage between the first air flow passage and the second piston; and,
   f) second valve means permitting air flow from the tire to the second piston such that, when the tire pressure reaches a predetermined level, the second piston moves relative to the first piston to activate the latching means, thereby preventing additional compressed air from being supplied to the tire.

2. The automatic pump of claim 1 wherein the latching means comprises:
   a) a neck ring attached to the pneumatic cylinder and defining an edge;
   b) a tapered portion formed on the second piston; and,
   c) at least one latching element attached to the first piston such that relative movement between the first and second pistons causes the tapered portion of the second piston to urge the at least one latching element into contact with the edge of the neck ring.

3. The automatic pump of claim 2 wherein the at least one latching element comprises a plurality of ball members.

4. The automatic pump of claim 1 further comprising a movable ball attached to the second end of the first piston so as to contact the drive cam.

5. The automatic pump of claim 1 further comprising means to adjust the second valve means so as to adjust the predetermined level of air pressure to be maintained in the tire.

* * * * *